United States Patent

Garcia

[11] Patent Number: 4,471,558
[45] Date of Patent: Sep. 18, 1984

[54] FISHHOOK AND LIVE BAIT HOLDER

[76] Inventor: Gilbert C. Garcia, 163 Tabard, San Antonio, Tex. 78213

[21] Appl. No.: 444,822

[22] Filed: Nov. 26, 1982

[51] Int. Cl.³ .............................................. A01K 83/06
[52] U.S. Cl. ........................................ 43/44.4; 43/44.8
[58] Field of Search ...................... 43/44.2, 44.4, 44.8, 43/44.82

[56] References Cited

U.S. PATENT DOCUMENTS

| | | | |
|---|---|---|---|
| 533,652 | 2/1895 | Kittle | 43/44.4 |
| 1,613,113 | 1/1927 | Leu | 43/44.4 |
| 2,598,011 | 5/1952 | Pitre | 43/44.8 |
| 2,605,579 | 8/1952 | Chadwick | 43/44.4 |
| 2,640,291 | 6/1953 | Garner | 43/44.82 |
| 3,197,913 | 8/1965 | Rainey | 43/44.8 |
| 3,387,402 | 6/1968 | Mays | 43/44.4 |
| 3,729,851 | 5/1973 | Garcia | 43/44.8 |
| 4,219,956 | 9/1980 | Hedman | 43/44.82 |

Primary Examiner—Kuang Y. Lin
Assistant Examiner—Marc Hodak
Attorney, Agent, or Firm—John C. Stahl

[57] ABSTRACT

A combined fishhook and live bait holder comprising an eye and first and second shanks each terminating rearwardly in an upstanding and forwardly directed hook, a holder slidably mounted on the shanks, a pin wedged between the shanks for securing the holder at a desired position, and an elastic strap secured to one hook, adapted to pass over the bait, and secured to the opposing hook.

1 Claim, 8 Drawing Figures

FISHHOOK AND LIVE BAIT HOLDER

BACKGROUND OF THE INVENTION

The prior art is replete with fishhooks including means to secure a live bait thereto. Typical prior art teachings include U.S. Pat. No. 533,652, 1,105,172, 1,386,061, 1,613,113, 2,598,011, 3,197,913, 3,387,402 and 3,398,477.

In many of these teachings, the bait is impaled on a spit or hook and soon dies, or is so restricted in movement to present an unnatural appearance.

SUMMARY OF THE INVENTION

The primary object of the invention is to provide a combined fishhook and live bait holder which securely holds a live bait without impairing its movement.

Another object is to provide such a combined fishhook and live bait holder wherein the bait is kept alive, active and relatively free to swim in its normal manner.

Still another object is to provide such a combined fishhook and live bait holder which is relatively inexpensive to manufacture, easy to use, and universal in its adaptability.

Other objects and features of the invention will become apparent to those skilled in the art from the following specification when read in the light of the annexed drawings.

DESCRIPTION OF PREFERRED EMBODIMENTS

Figure 1:
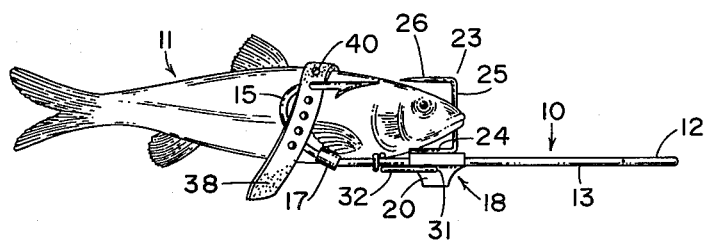
FIG. 1 is a side elevational view of the combined fishhook and live bait holder of the subject invention.
Figure 3:
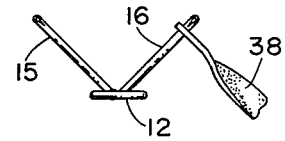
FIG. 3 is a front end view of FIG. 2.

Referring now to the drawings, wherein like reference numerals designate like or corresponding parts throughout the several views, there is shown in FIG. 1 a preferred embodiment of combined fishhook and live bait holder 10 of the subject invention with a minnow, salamander or other live bait 11 secured thereto. More particularly, holder 10 of any suitable size terminates forwardly in eye 12 with normally parallel shanks 13-14 terminating rearwardly in upstanding and forwardly directed hooks 15-16, respectively. As viewed in FIG. 3, hooks 15, 16 diverge with respect to the medial, vertical plane, each preferably at an angle of approximately forty-five degrees. Collar 17 is carried on shank 13 and normally positioned adjacent hook 15; said collar may be slidably positioned at any point along shank 13 and is adapted to bear against the corresponding portion of shank 14 wedging said shanks apart a desired distance to accommodate baits of varying widths.

Figure 5:
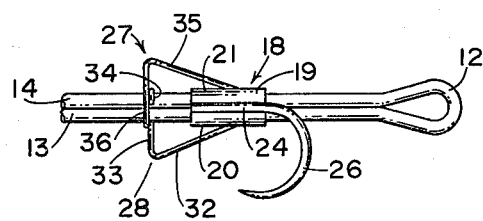
FIG. 5 is a fragmentary, greatly enlarged top plan view of the front holder.

Front holder 18 is adapted to be slidably mounted on shanks 13, 14 and adjustably secured thereto at any point rearwardly of eye 12, dependent upon the length of the bait. Specifically, holder 18 is generally of inverted U-shape as viewed in transverse, vertical section and includes flat base 19 with longitudinally extending and downwardly depending flanges 20-21 passing laterally of the respective shanks. Desirably the foremost and rearmost lower edges of said flanges are turned inwardly, or crimped, indicated by reference numeral 22, at least slightly below and partially overlapping said shanks whereby said holder is loosely secured thereto. Hook 23 includes base 24 lying in the medial, longitudinal plane of base 19 and conventionally secured thereto, upstanding leg 25, and horizontally extending, U-shaped hook 26 which opens rearwardly, as viewed in FIG. 5 of the drawings.

Figure 6:
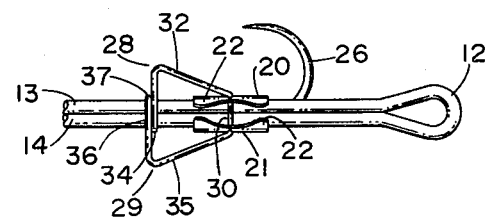
FIG. 6 is a fragmentary, greatly enlarged bottom plan view of the front holder.

Bent wire clasp 27, preferably of spring steel or the like, is carried in front holder 18; for purposes of convenience only, section 28 of said clasp will first be described, it is understood that opposing section 29 is substantially similar in construction. The medial, transverse section 30 of said clasp (see FIG. 6) passes below shanks 13, 14 and thence through a transversely aligned bore 31 in flange 20; diverging section 32 lies in a horizontal plane and terminates rearwardly in inturned section 33 which is essentially perpendicular to the major axis of said holder and passes below said shanks, with upturned and inwardly directed hook 34 adapted to at least partially pass around shank 14.

In like manner, section 29 includes diverging section 35 lying in the horizontal plane of section 32, inturned section 36 adapted to pass below said shanks and rearwardly of section 33, with upturned and inwardly directed hook 37 adapted to at least partially pass around and engage shank 13. It is evident that upon compressing sections 32, 35 of said clasp the respective hooks 34, 37 are at least partially separated and front holder 18 may then be moved a desired distance in either direction on said shanks to accommodate a bait of any length; upon releasing such compressive force, hooks 34, 37 again engage the opposing shanks in the manner heretofore described.

Figure 2:
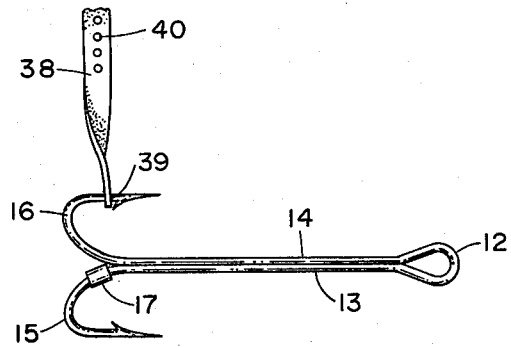
FIG. 2 is a top plan view of the subject invention, with the front holder removed, showing the shanks in abutting and parallel relationship.
Figure 4:
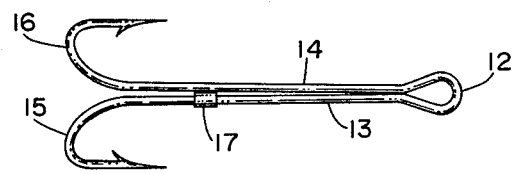
FIG. 4 is a top plan view with the front holder removed, showing the shanks partially separated.

As viewed in FIGS. 1 and 2, elastic strap 38 terminates at one end in loop or bore 39 through which hook 16 is passed; the remote end of said strap includes a plurality of longitudinally spaced bores 40. In normal usage, hook 26 is first passed through the jaws of bait 11; the bait is then rotated to face forwardly and supported upon shanks 13, 14 of said holder with strap 38 passed laterally over said bait, preferably anteriorly of the dorsal fin, and the opposing hook 15 passed through a selected bore 40 in said strap.

Figure 7:
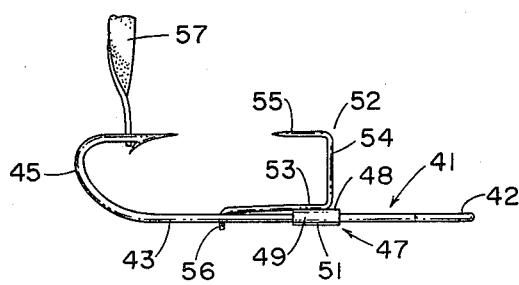
FIG. 7 is a side elevational view of another embodiment of the invention.
Figure 8:
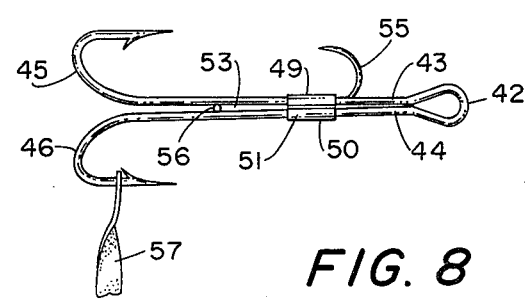
FIG. 8 is a bottom plan view of the embodiment of FIG. 7.

There is shown in FIGS. 7 and 8 another embodiment of holder 41 constructed in accordance with the principles of the subject invention. Holder 41 terminates forwardly in eye 42 with normally abutting shanks 43-44 terminating rearwardly in upstanding and forwardly directed hooks 45-46, respectively. Front holder 47 of metallic or plastic composition is slideably mounted upon shanks 43, 44 rearwardly of eye 42, said front holder includes top 48, opposing sides 49-50, and longitudinally split bottom 51, such members pass around shanks 43, 44 in a relatively tight fit.

Hook 52 includes medially and longitudinally extending base 53 which is conventionally secured forwardly to top 48, essentially vertically extending leg 54, and U-shaped, rearwardly opening hook 55. Base 53 extends substantially rearwardly of the trailing edge of top 48 and terminates in downwardly depending leg 56 adapted to bear against the opposing inner sides of shanks 43, 44 wedging said shanks outwardly against the inner walls of sides 49, 50 thereby securing front holder 47 in a desired position on said shanks.

Elastic strap 57, substantially similar to strap 38 heretofore described in detail, is secured to hook 46; a live bait is secured to hook 55, rotated to face forwardly and supported upon shanks 43, 44 with strap 57 passed over said bait and the opposing hook 45 passed through a selected bore in said strap.

It should be understood, of course, that the foregoing disclosure relates to only preferred embodiments of the invention and that numerous modifications or alterations may be made therein without departing from the spirit and scope of the invention as set forth in the appended claims.

What is claimed is:

1. A combined fishhook and live bait holder comprising
   an eye intermediate first and second essentially parallel shanks,
   said first and second shanks terminating rearwardly in upstanding and forwardly directed first and second hooks respectively,
   a front holder slidably mounted on said shanks,
   an upstanding and rearwardly directed third hook secured to said front holder,
   said third hook terminating rearwardly in a downwardly depending leg intermediate said shanks to wedge said shanks apart, and
   an elastic strap secured at one end to said first hook and adapted to pass over said bait and secured to said second hook.

* * * * *